Figure 1:
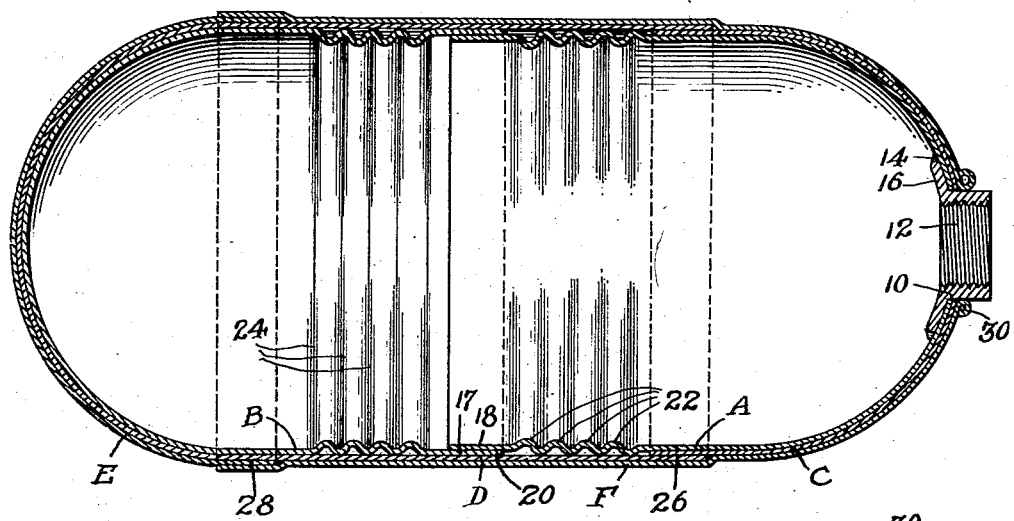

April 3, 1945.  H. C. STEARNS  2,372,800

HIGH PRESSURE VESSEL

Filed Aug. 21, 1942

Inventor
Harry C. Stearns
BY
Attorney.

Patented Apr. 3, 1945

2,372,800

UNITED STATES PATENT OFFICE 2,372,800

HIGH-PRESSURE VESSEL

Harry C. Stearns, Chicago, Ill., assignor to Products Development, Inc., Chicago, Ill., a corporation of Illinois Application August 21, 1942, Serial No. 455,597

3 Claims. (Cl. 220—3)

My invention relates to the manufacture of vessels of the kind used to contain gases under high pressure.

The invention may be employed, for example, in the making of "bottles" for supplying oxygen to aviators in high altitude flying. The bottles used in this service must withstand 4000 pounds per square inch internal pressure without appreciable volume change.

At the present time, such vessels are made from steel billets by a hot forging process. In hot forging, the metal must be worked at exactly the right temperature to get satisfactory results. The optimum conditions are not always attained, and hence there is a high proportion of rejects. Obviously the inspection standards must be rigid, because no chances can be taken with a product which shows any doubtful signs.

Available hot forging facilities are critically limited in these times, so there is a real need for a high pressure tank which can be made in some other way, using manufacturing facilities which are more freely available.

The present invention pertains to a tank which can be assembled from parts drawn from sheet stock. These parts are in the nature of telescoping shells which are pressed together one over the other, the joints or seams being welded or brazed. A laminar wall structure results, having high mechanical strength.

It is an object of my invention, therefore, to provide a tank construction which can be fabricated without the necessity of hot forging operations.

It is a further object to provide a construction for a high pressure vessel, embodying laminar walls.

Further, in a vessel having laminar walls, it is an object to provide means whereby the seams in the inner shell will be relieved so far as possible from strains either in the manufacture or in the subsequent handling of the vessel.

Another object is to provide high pressure gas in a tank to be used for military purposes, a structure which is well adapted to resist rupture if struck by a projectile.

Another object is the provision of a pressure vessel which will utilize the metal most effectively, i. e., which will not have a great excess of metal at points where it does not contribute to the strength of the vessel.

Still another object is to provide a construction for vessels of the kind described which will be economical in manufacture, making possible a uniform product, and a minimum number of irregulars and rejects.

Figure 2:
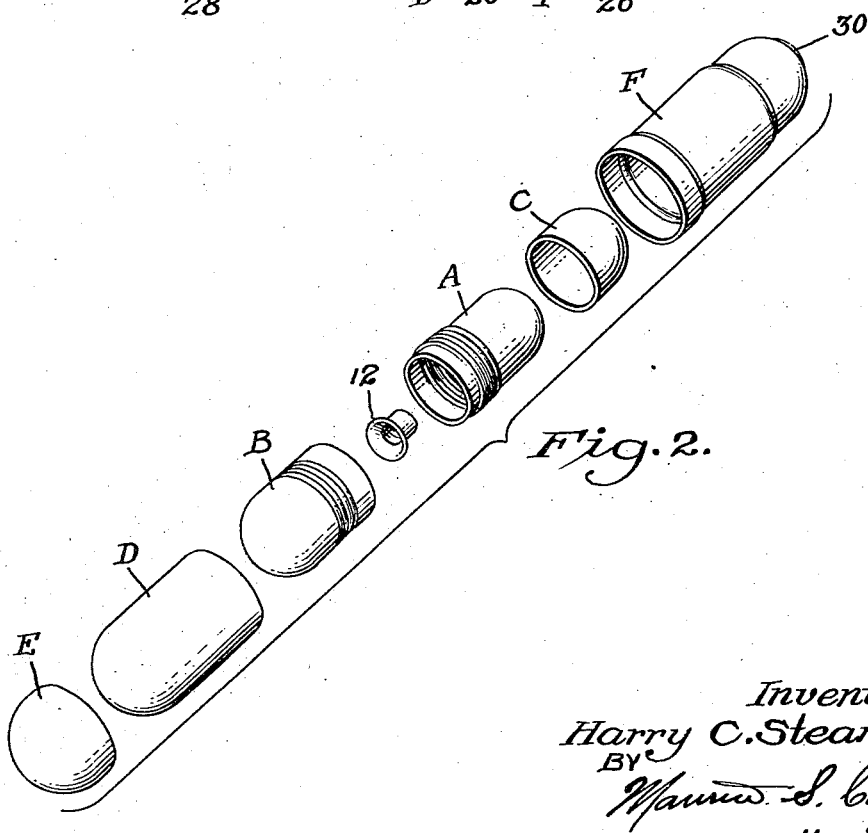

With these and other objects in view, my invention consists in the construction, arrangement and combination of the various parts of my device whereby the objects contemplated are attained, as hereinafter more fully set forth, pointed out in my claims, and illustrated in the accompanying drawing, in which:

Figure 1 is a longitudinal section through a high pressure vessel made according to my invention; and Figure 2 is an exploded view of the members entering into the complete assembly.

In the drawing I have shown a vessel, such as an aviator's oxygen bottle, with a laminar wall of three thicknesses. It will be understood, of course, that the showing of three thicknesses is merely illustrative, and that any desired number of shells may be used, as may be most practical for the use to which the tank is put.

In the drawing the telescoping shells are designated generally by the letters A to F, the alphabetical order corresponding to the order in which the respective members are added to the assembly. These shells may be drawn from sheet steel by methods well known in the art, the operations being performed on punch presses. For an oxygen bottle of the kind illustrated in the drawing, made in a size approximately 15 inches long, sheet steel of about $\frac{1}{16}$ inch thickness may be used.

The shell A has a circular opening 10 in its rounded end, and the first step in assembly is to fix in this opening a fitting 12, which is threaded to receive a valve or other device (not shown) for controlling the flow of gas. The fitting is sealed in place by hydrogen brazing, indicated at 14, around the flange 16 of the fitting.

The inner shells A and B are nearly equal in length, so that they can be telescoped in a press fit to form a joint 17 at about the middle of the bottle. An overlap of about an inch is desirable, and the joint is carefully cleaned and hydrogen brazed.

On each side of the cylindrical portions 18 and 20, which telescope to form the joint, the shells A and B are formed into series of annular corrugations 22 and 24, for purposes which will become more fully evident as the description proceeds.

After joining of the members A and B is completed, the shell C is pressed over A, and the shell D is pressed on from the opposite end. They meet in a joint 26, spaced by corrugations 22 from the joint 17. This makes it possible to braze the joint 26 without undue heating of the previous joint 17.

In the final step, shell E is placed over the member D, and F is telescoped over C. A third joint 28 is thus formed, on the opposite side of corrugations 24 from the inner seam 17. The third joint preferably has the same lap and is brazed in the same way as the others.

To give added strength, the shell F has a rolled edge 30 formed where it encircles the threaded fitting 12. If desired, this edge may be brazed to the fitting.

With respect to the brazing operations, it may be noted that in some of the alloys now available for this purpose, tensile strength characteristics up as high as 115,000 pounds per square inch can be obtained, so that with careful work it is possible to make seams that are as strong as the material joined.

Induction heating may well be employed for the brazing operations, since it would facilitate heating of the inside sheet uniformly and to substantially the same extent as the outer one. This makes it possible, with other local heating means, such as the hydrogen torch, to accomplish the brazing quickly, and hence without undue temperature rise in other areas, including the previously made joints.

The advantages of the corrugations 22 and 24 justify description in some detail. In the first place, it will be apparent that because of the increased length of the conducting path, and the greater radiating surface exposed to the air, the corrugations will reduce the conduction of heat along the shells A and B, so that the first joint 17 need not be affected by the subsequent operations. This is important for the reason that the innermost seam is the most critical one; if it remains gas tight, then the outer shells, and their joints, need serve only the purpose of adding mechanical strength to withstand the loading of the internal pressure.

The corrugations provide a transverse reinforcement which throws no strain on the gas seal surfaces, but does tend to rigidify the walls in the mid-section of the bottle.

If the fit between the shells A and B and the next ones is not perfect, there may be a little space at the ends, and it will be clear that when the vessel is under pressure, the pressure will tend to separate A and B longitudinally, in order to transfer the load to the next outer shells. Such a tendency would result in a shearing force on the joint 17. Provision of the corrugations permits a degree of longitudinal "expansion" of members A and B, thus relieving the joint of shearing stresses.

Impact resulting in deformation of the end portions of the bottle, such as might occur if it were struck by a projectile, or even if it were accidentally dropped, need not place any great strain on the inner seam, since the corrugations represent enough "slack" so that the effects of the deformation will not be transferred to the middle portion of the inner shells.

Speaking now more broadly of my laminar construction for a vessel of this type, it is believed to have superior qualities in resistance to gunfire. A projectile or fragment striking the tank would be gradually decelerated. If several of the wall shells were penetrated, the layers would be successively less rigid, and energy would be expended in deforming each of them. As for the inner shells, I have just described how they could be subject to considerable bending, anywhere but in the actual region of the seam, without breaking the seal. Hence the structure should be able to yield or bend substantially under the impact of projectiles, before suffering actual rupture such as to cause loss of the gas.

Provision of the flange 16 on the fitting 12, together with the reinforcing bead 30, allows the forces exerted on the fitting to be transmitted in bearing on the walls, so that no appreciable shear is exerted on the brazed seal 14. The surface of the flange is curved to conform to the spherical surface of the shell against which it fits, so that the force is uniformly applied over a substantial area of the shell.

Where required as protection against oxidation or other reactions, stainless steel may be used for the inner shells, since satisfactory brazing methods are now available for this metal. Alternatively, the interior of the bottle may be coated in any suitable way with a protective lacquer or the like.

Where extra high strength is required for a given weight, the outer shells may be of higher tensile strength steel, or may be treated by any of the well-known processes for increasing the strength characteristics.

When bottles of this kind are made by the customary hot forging process, it is almost impossible to control the thickness of the walls with any great accuracy, so various portions of the walls are not uniform in thickness. Generally speaking, the strength of the vessel is determined by the thin spots, so that much of the metal in thicker portions simply represents extra weight which contributes nothing useful to the ultimate strength. In my construction the wall thickness is substantially uniform, and there is no excess metal, no dead weight. In military aviation, every ounce may be important.

Some changes may be made in the construction and arrangement of the parts of my device without departing from the real spirit and purpose of my invention, and it is my intention to cover by my claims any modified forms of structure or use of mechanical equivalents which may reasonably be included within their scope.

I claim:

1. A vessel for holding fluid under pressure, comprising a plurality of shells each having a hemispherical end portion and a substantially cylindrical portion adjacent thereto, a pair of said shells having their cylindrical portions telescoped in a lap joint, the cylindrical portion of said shells on each side of said joint being provided with a series of spaced annular corrugations, a second pair of said shells being press fitted over said first pair, with their cylindrical portions telescoped, the telescope joint of said second pair of shells being offset longitudinally of the vessel from the joint of the first pair, so that the corrugations on one side of the lap joint are intermediate said joint and the joint in the second pair of shells.

2. In a vessel formed of a plurality of concentric shells constituting a laminar wall, and having substantially hemispherical ends, one of said ends having an axial opening therein, means for making connection to said vessel consisting of a fitting centered in said opening, an annular flange on said fitting inside of said vessel, formed with a spherical surface conforming to the adjacent surface of the inner shell, said flange being sealed to said inner shell, and a return bent edge on the outer shell around said opening closely adjacent but unattached to said fitting so that said edge may be distorted without disturbing the nipple or its seal with the inner shell.

3. In a pressure vessel having an inner gas-tight wall and an intermediate wall fitted snugly one within the other, an outer wall enclosing the assembly snugly, each of said walls being formed of a pair of shells each hemispherical at one end and joined together in an overlapping relation, at least the joining in the inner wall being gas-tight, a plurality of circumferential corrugations in the inner wall on each side of the gas-tight joint to enable expansion or contraction of said inner wall without rupturing said joint, and the joining of the shells in the remaining walls being offset from the joint in the inner wall and from each other.

HARRY C. STEARNS.